United States Patent
Zhao et al.

(10) Patent No.: US 9,676,972 B2
(45) Date of Patent: Jun. 13, 2017

(54) FRAME SEALANT COMPOSITION AND METHOD OF PREPARING THE SAME, LIQUID CRYSTAL PANEL CONTAINING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiuqiang Zhao, Beijing (CN); Ang Xiao, Beijing (CN); Hao Wu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 270 days.

(21) Appl. No.: 14/386,503

(22) PCT Filed: Dec. 20, 2013

(86) PCT No.: PCT/CN2013/090100
§ 371 (c)(1),
(2) Date: Sep. 19, 2014

(87) PCT Pub. No.: WO2015/010433
PCT Pub. Date: Jan. 29, 2015

(65) Prior Publication Data
US 2016/0237326 A1    Aug. 18, 2016

(30) Foreign Application Priority Data
Jul. 22, 2013   (CN) .......................... 2013 1 0309112

(51) Int. Cl.
*C09J 133/12* (2006.01)
*C09J 133/08* (2006.01)
(Continued)

(52) U.S. Cl.
CPC ........... *C09J 133/12* (2013.01); *C09J 133/08* (2013.01); *C09J 163/10* (2013.01); *G02F 1/1339* (2013.01)

(58) Field of Classification Search
CPC ............................. C09J 133/08; C09J 133/12
See application file for complete search history.

(56) References Cited

U.S. PATENT DOCUMENTS 4,210,774 A * 7/1980 Perry .................... B29C 67/243
174/110 SR
5,868,887 A * 2/1999 Sylvester .............. H01L 23/145
156/150
(Continued)

FOREIGN PATENT DOCUMENTS

| CN | 1886479 A | 12/2006 |
| CN | 101210169 A | 7/2008 |
| CN | 103173159 A | 6/2013 |

OTHER PUBLICATIONS

Written Opinion of the International Searching Authority dated Apr. 21, 2014: PCT/CN2013/090100

*Primary Examiner* — Megan McCulley
(74) *Attorney, Agent, or Firm* — Ladas & Parry LLP

(57) ABSTRACT

A frame sealant composition and a method of preparing the same, a liquid crystal panel containing the frame sealant composition. The frame sealant composition comprises a resin, a catalyst, a solvent, a hydrophobic silica filler, and silicon spheres; wherein, the hydrophobic silica filler has a shape of irregular polyhedron. The optimum of hydrophobic silica particles increases the whole surface area of the silica particles and correspondingly enhances the hydrophobicity (Continued)

of the frame sealant composition. The frame sealant composition further comprises a dispersant, the addition of which makes the silica fillers more evenly distributed in the frame sealant composition and avoids void caused by the uneven distribution. Even distribution of silica fillers in conjunction with an increase of specific surface area functions to enhance the waterproof property of the frame sealant composition, such that the liquid crystal panel sealed with the frame sealant composition can better block external moisture and prevent internal metal wires from corroding.

15 Claims, 2 Drawing Sheets

(51) Int. Cl.
    *C09J 163/10*      (2006.01)
    *G02F 1/1339*      (2006.01)

(56) References Cited

U.S. PATENT DOCUMENTS

| | | | |
|---|---|---|---|
| 8,022,130 B2* | 9/2011 | Nowak | C09J 11/04 524/492 |
| 2001/0023533 A1* | 9/2001 | Sylvester | H01L 23/055 29/830 |
| 2002/0021138 A1* | 2/2002 | Budnaitis | G01R 31/2863 324/750.05 |
| 2012/0111621 A1* | 5/2012 | Ohigashi | B32B 15/08 174/258 |

* cited by examiner

FRAME SEALANT COMPOSITION AND METHOD OF PREPARING THE SAME, LIQUID CRYSTAL PANEL CONTAINING THE SAME

TECHNICAL FIELD

Embodiments of the present invention relate to a frame sealant composition and a method of preparing the same, a liquid crystal panel containing the frame sealant composition.

BACKGROUND

Thin Film Transistor Liquid Crystal Display (TFT-LCD) is one of active matrix liquid crystal displays and becomes a predominant product in the new century. The conventional TFT-LCD is manufactured by cell assembling a TFT array substrate and an opposite substrate and drop-filling a liquid crystal. The opposite substrate can be a conventional color film (CF) substrate, or can be manufactured on the array substrate through CF On Array (COA). Cell assembly process is an important step during the process of manufacturing TFT-LCD. In order to ensure normal use of TFT-LCD under various environments, especially under a high temperature and high humidity environment, water molecules should be avoided to permeate the sealing material to enter the liquid crystal cell interior to corrode the metal wires and cause poor display. Therefore, a frame sealant composition is used to seal the liquid crystal cell. When a frame sealant is used to seal the liquid crystal cell, it must be hydrophobic after curing, otherwise it would not function to block water.

Currently, the frame sealant composition mainly consists of a resin, a catalyst, a solvent, and a spherical silica filler. In practice, the spherical silicon filler has small surface energy, which will affect the waterproof property. During the cell assembly process prior to the curing of the frame sealant composition, the spherical silica fillers are liable to move when being pressed such that they would aggregate in some areas, resulting in an uneven distribution (as shown in FIG. 1). This will cause the liquid crystal panel sealed with such frame sealant composition not to achieve the desired waterproof property. Especially in a harsh environment with high temperature and high humidity, the water molecules will easily permeate the voids to enter the liquid crystal cell interior, causing corrosion to metal. Therefore, the embodiments of the present invention aim to provide a frame sealant composition and a method of preparing the frame sealant composition, a liquid crystal panel sealed with said frame sealant composition, wherein, the hydrophobicity of the frame sealant composition is enhanced such that the liquid crystal panel can achieve an improved waterproof effect.

SUMMARY

An embodiment of the present invention provides a frame sealant composition, comprising:
70 wt %-80 wt % of a resin,
2 wt %-10 wt % of a catalyst,
2 wt %-10 wt % of a solvent,
2.5 wt %-10 wt % of a hydrophobic silica filler,
1 wt %-1.5 wt % of silicon spheres;
wherein, the hydrophobic silica filler has a shape of irregular polyhedron, and the resin is a mixture of an acrylate resin and an epoxy resin.

The frame sealant composition further comprises 1.5 wt %-3 wt % of a dispersant.

The hydrophobic silica filler is added in amount of 5 wt %-7.5 wt %.

The hydrophobic silica filler has an average particle size of 150 nm-250 nm.

The dispersant is selected from at least one of superdispersant YRC, N,N-dimethylaminopropylamine, and polyacrylate.

The epoxy resin and the acrylate resin independently have a number-average molecular weight of 5000-10000.

The weight ratio of the acrylate resin to the epoxy resin is 55-95:5-45.

An embodiment of the present invention further provides a method of preparing the frame sealant composition, comprising the steps of:
a. ultrasonically oscillating hydrophobic silica particles under a first ultrasonication condition to produce hydrophobic silica particles having a shape of irregular polyhedron;
b. mixing the hydrophobic silica particles having a shape of irregular polyhedron with a dispersant and a solvent, and ultrasonically dispersing the mixture under a second ultrasonication condition to produce a dispersion of hydrophobic silica particles;
c. mixing an epoxy resin, an acrylate resin, a catalyst, and a solvent, to form a resin mixture;
d. homogeneously mixing the dispersion of hydrophobic silica particles with the resin mixture, to produce the frame sealant composition.

The first ultrasonication condition comprises an ultrasonication at 50 kHz for 5-20 min.

The second ultrasonication condition comprises an ultrasonication at 90 kHz for 5-20 min.

The method further comprises a step of performing an ultrasonic grading at 50 kHz after the step of ultrasonically oscillating under the second ultrasonication condition.

An embodiment of the present invention further provides a liquid crystal panel, comprising an array substrate and an opposite substrate which are oppositely provided, wherein, the array substrate and the opposite substrate are sealed with the frame sealant composition.

DETAILED DESCRIPTION

The embodiments of the present invention will be described clearly and completely hereinafter. It is apparent that the described embodiments represent only a portion of, rather than all of the embodiments of the present invention. Based on the embodiments of the present invention, persons of ordinary skill in the art can obtain other embodiments without creative work, all of which are encompassed within the present invention.

An embodiment of the present invention provides a frame sealant composition, comprising: 70 wt %-80 wt % of a resin, 2 wt %-10 wt % of a catalyst, 2 wt %-10 wt % of a solvent, 2.5 wt %-10 wt % of a hydrophobic silica filler, and 1 wt %-1.5 wt % of silicon spheres; wherein, the hydrophobic silica filler has a shape of irregular polyhedron, and the resin is a mixture of an acrylate resin and an epoxy resin.

The frame sealant composition further comprises 1.5 wt %-3 wt % of a dispersant.

The resin can be a mixture of the acrylate resin and the epoxy resin commonly used in the art, such as a mixture of polymethyl methacrylate and bisphenol A epoxy resin, wherein the weight ratio of the acrylate resin to the epoxy resin is 55-95:5-45, and preferably 65-80:20-35. The acrylate resin and the epoxy resin independently have a number-average molecular weight of 5000-10000.

The dispersant can be any of hydrophobic dispersants commonly used in the art, it can be selected from for example superdispersant YRC, N,N-dimethylaminopropylamine, and polyacrylate.

The silicon spheres are silica particles having an average particle size of 1-5 μm for keeping the cell gap. It is preferred to use silica particles having an average particle size of 3-4 μm, which is closest to the design value for cell gap.

The catalyst can be any of catalysts used in the art for facilitating the curing of the resin under an UV irradiation, such as α,α-diethoxy acetophenone.

The solvent can be a conventional solvent in the art and is not particularly limited.

For example, it can be propylene glycol monomethyl ether acetate, acrylate solvents.

Figure 1:
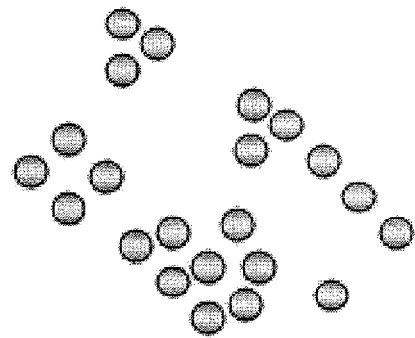
FIG. 1 is a schematic diagram showing the distribution of the silica fillers in the current frame sealant composition.
Figure 2:
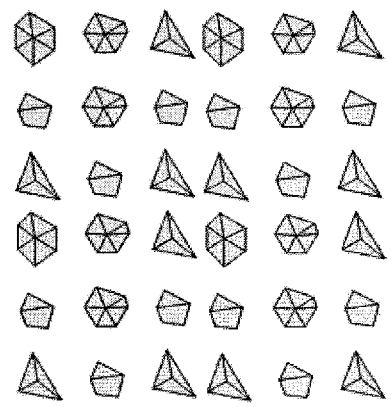
FIG. 2 is a schematic diagram showing the distribution of the hydrophobic silica fillers in the frame sealant composition according to the example of the present invention.

The frame sealant composition according to the embodiments of the present invention optimizes the shape of the hydrophobic silica fillers, based on the resin, the catalyst, the solvent and the hydrophobic silica fillers. The silica fillers added to current frame sealant compositions are typically spherical (as shown in FIG. 1). In the embodiments of the present invention, they are optimized to have a shape of irregular polyhedron having an average particle size of 150-250 nm, and preferably 200 nm (as shown in FIG. 2). The silica fillers are added in an amount of 2.5-10% by weight of total frame sealant composition, and preferably 5-7.5% by weight of total frame sealant composition. Here, particle size and weight percent for the silica fillers are selected in such a way that the frame sealant composition can achieve optimum under the same conditions. Based on the principle that a sphere has the smallest surface area for the matter having the same volume, the spherical silica particles added to current frame sealant compositions theoretically have the smallest waterproof surface area. Based on the principle that the larger the surface area is, the larger the surface energy is and thus the stronger the hydrophobicity is, the hydrophobic silica particles having a shape of irregular polyhedron will increase the surface area of the silica particles having the same volume by 5%-20%, and the hydrophobiclity of the frame sealant composition will be enhanced as a whole with the increase of area of the silica particles.

Meanwhile, a dispersant is added to the frame sealant according to the embodiments of the present invention. The frame sealant composition without a dispersant would have an uneven distribution of hydrophobic silica fillers, as the hydrophobic silica fillers may move when being pressed before curing and after sealing, which would affect the waterproof property. In the embodiments of the present invention, the addition of the dispersant can make the silica fillers evenly distribute in the frame sealant composition, such that when the frame sealant composition moves when being pressed before curing and after sealing, the silica fillers remain an even distribution and ensure the cured framed sealant to have good hydrophobicity.

An embodiment of the present invention further provides a method of preparing the frame sealant composition, comprising the steps of:

a. ultrasonically oscillating hydrophobic silica particles under a first ultrasonication condition to produce hydrophobic silica particles having a shape of irregular polyhedron;

b. mixing the hydrophobic silica particles having a shape of irregular polyhedron with a dispersant and a solvent and ultrasonically dispersing the mixture under a second ultrasonication condition to produce a dispersion of hydrophobic silica particles;

c. mixing an epoxy resin, an acrylate resin, a catalyst, and a solvent, to form a resin mixture;

d. homogeneously mixing the dispersion of hydrophobic silica particles with the resin mixture, to produce the frame sealant composition.

The first ultrasonication condition comprises an ultrasonication at 50 kHz for 5-20 min.

The second ultrasonication condition comprises an ultrasonication at 90 kHz for 5-20 min.

The method further comprises a step of performing an ultrasonic grading at 50 kHz after the step of ultrasonically oscillating under the second ultrasonication condition.

For example, in step a, the silica fillers having a shape of irregular polyhedron can be prepared by an ultrasonic mechanical process, comprising: adding polyethylene glycol octylphenyl ether and n-amyl alcohol to ethylene oxide (polyethylene glycol octylphenyl ether:n-amyl alcohol:ethylene oxide, 1:1:3-1:1:5 by volume), to give a mixture I; ultrasonically vibrating the mixture I at 50 kHz, to which water having a volume 3-5 times more than that of the mixture of I is added, to give a mixture II; adding conventional silica fillers (of which the volume is 30% by volume of the mixture II) and continuing to ultrasonically vibrate for 5-20 min, to produce a microemulsion; adding a concentrated sulfuric acid with a volume ratio of 20-40% to generate a silica precipitation; and sintering the resulting participation at 100-200° C., to produce nanoscale silica particles. Further, the nanoscale silica particles are subjected to an ultrasonic grading at 50 kHz for 5-20 min, and then the silica particles of 50-100 nm having a shape of irregular polyhedron are remained.

For example, the frame sealant composition prepared by the aforesaid method can be stored at a low temperature of −25° C.-15° C., and preferably −20° C.

The frame sealant composition can be used to seal the liquid crystal panel through a convention coating process and an UV curing.

The specific examples of the present invention and comparative examples will be illustrated below in conjunction with the Figures.

Preparation Examples

Polyethylene glycol octylphenyl ether and n-amyl alcohol are added to ethylene oxide (polyethylene glycol octylphenyl ether:n-amyl alcohol:ethylene oxide, 1:1:3 by volume), to give a mixture I. The mixture I is ultrasonically vibrated at 50 kHz, followed by the addition of water having a volume 3 times more than that of the mixture of I, to give a mixture II. The conventional hydrophobic silica fillers (of which the volume is 30% by volume of the mixture II) are added and ultrasonically vibrating is continued for 20 min, to produce a microemulsion. A concentrated sulfuric acid with a volume ratio of 20% is added to generate a silica precipitation, which is sintered at 100° C., to produce nanoscale silica particles. Subsequently, after the sintered nanoscale silica particles are subjected to an ultrasonic grading at 50 kHz for 5 min, and then the silica particles with an average particle size of 150-250 nm having a shape of irregular polyhedron are remained.

Example 1

In Example 1, each of the components are: 80 wt % of a resin, 8 wt % of a catalyst, 7 wt % of a solvent, 2.5 wt % of hydrophobic silica fillers, 1 wt % of silicon spheres, 1.5 wt % of a dispersant. Particularly, the following solution can be exemplified.

1.25 g of hydrophobic silica particles prepared above (average particle size: 150 nm), 0.5 g of silicon spheres (average particle size: 3 μm), 0.75 g of superdispersant YRC, and 1 g of solvent propylene glycol monomethyl ether acetate are mixed and ultrasonically vibrated at 90 kHz for 20 min, to give a dispersion of hydrophobic silica particles.

40 g of a mixture of polymethyl methacrylate (Mn=5000) and a bisphenol A epoxy resin (Mn=10000) (in a weight ratio of 55:45) is mixed with 4 g of catalyst α,α-diethoxy acetophenone, 2.5 g of solvent propylene glycol monomethyl ether acetate, to give a resin mixture.

The dispersion of hydrophobic silica particles is mixed with the resin mixture to give 50 g of a frame sealant composition 1.

FIG. 2 is a schematic diagram showing the distribution of the hydrophobic silica fillers in the frame sealant composition of Example 1. As shown in FIG. 2, the hydrophobic silica fillers are evenly and compactly distributed through the frame sealant. Because the silica fillers are in the form of irregular polyhedron, and have smaller volume with the same surface area, the numbers of distribution layers thereof and the numbers of particles can be increased in the space of the same volume, such that the specific surface area of hydrophobic matter in the frame sealant with the same volume will be increased, the hydrophobic interface of solid silica can thus be increased and the hydrophobicity of the frame sealant composition can be optimized.

Example 2

In Example 2, each of the components are: 77 wt % of a resin, 7 wt % of a catalyst, 7.5 wt % of a solvent, 5 wt % of hydrophobic silica fillers, 1.5 wt % of silicon spheres, 2 wt % of a dispersant. Particularly, the following solution can be exemplified.

50 g of frame sealant composition 2 is prepared by the same method as in Example 1, except of using 38.5 g of a mixture of polymethyl methacrylate and a bisphenol A epoxy resin in a weight ratio of 65:35, 3.5 g of α,α-diethoxy acetophenone, 3.75 g of propylene glycol monomethyl ether acetate (where, 2.25 g for use in the resin mixture, and 1.5 g for use in the dispersion of silica particles), 2.5 g of hydrophobic silica fillers having a shape of irregular polyhedron (average particle size: 200 nm), 0.75 g of silicon spheres (average particle size: 3 μm), and 1 g of polyacrylate.

Example 3

In Example 3, each of the components are: 75 wt % of a resin, 6 wt % of a catalyst, 8 wt % of a solvent, 7.5 wt % of hydrophobic silica fillers, 1 wt % of silicon spheres, 2.5 wt % of a dispersant. Particularly, the following solution can be exemplified.

50 g of frame sealant composition 3 is prepared by the same method as in Example 1, except of using 37.5 g of a mixture of polymethyl methacrylate and a bisphenol A epoxy resin in a weight ratio of 80:20, 3 g of α,α-diethoxy acetophenone, 4 g of propylene glycol monomethyl ether acetate (where, 2 g for use in the resin mixture, and 2 g for use in the dispersion of silica particles), 3.75 g of hydrophobic silica fillers having a shape of irregular polyhedron (average particle size: 250 nm), 0.5 g of silicon spheres (average particle size: 3 μm), and 1.25 g of polyacrylate.

Example 4

In Example 4, each of the components are: 70 wt % of a resin, 6 wt % of a catalyst, 10 wt % of a solvent, 10 wt % of hydrophobic silica fillers, 1 wt % of silicon spheres, 3 wt % of a dispersant. Particularly, the following solution can be exemplified.

50 g of frame sealant composition 4 is prepared by the same method as in Example 1, except of using 35 g of a mixture of polymethyl methacrylate and a bisphenol A epoxy resin in a weight ratio of 95:5, 3 g of α,α-diethoxy acetophenone, 5 g of acrylate (where, 1.5 g for use in the resin mixture, and 3.5 g for use in the dispersion of silica particles), 5 g of hydrophobic silica fillers having a shape of irregular polyhedron (average particle size: 200 nm), 0.5 g of silicon spheres (average particle size: 3 μm), and 1.5 g of N,N-dimethylaminopropylamine.

Comparative Examples 1-4

50 g of frame sealant compositions 5-8 are prepared by the same method, components and amounts as in Examples 1-4, except that the silica fillers added are conventional spherical silica fillers (correspondingly, average particle size: 150 nm-250 nm).

Comparative Example 5

In Comparative Example 5, each of the components are: 80 wt % of a resin, 8 wt % of a catalyst, 8.5 wt % of a solvent, 2.5 wt % of hydrophobic silica fillers, 1 wt % of silicon spheres. Particularly, the following solution can be exemplified.

Frame sealant composition 9 is prepared by the same method as in Example 1, except that no superdispersnat YRC is used and 4.25 g of propylene glycol monomethyl ether acetate (where, 2.5 g for use in the resin mixture, and 1.75 g for use in the dispersion of silica particles) is used.

Each of the frame sealant compositions of Examples 1-4 is coated onto the array substrate and the opposite substrate by a conventional method in the art, and sealed routinely, to manufacture a liquid crystal panel.

Water Permeability Experiment

Figure 3:
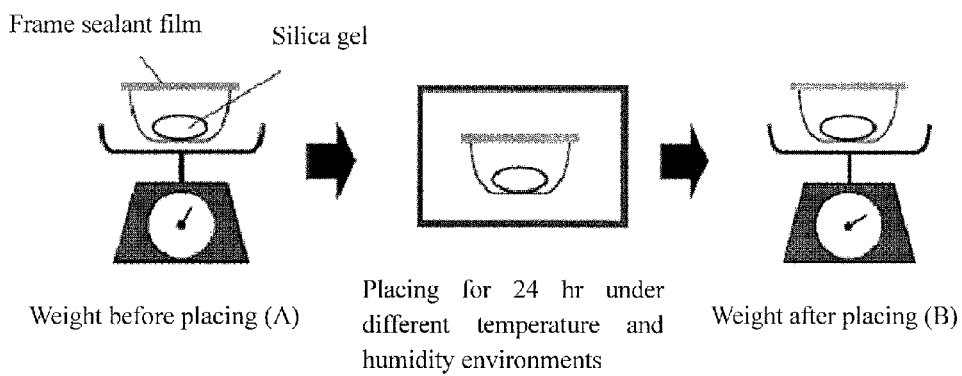
FIG. 3 is a flow chart of water permeability experiment for a cured film of the frame sealant.

According to the flow chart shown in FIG. 3, a water permeability experiment is performed on each of frame sealant compositions of Examples 1-4 and Comparative Examples 1-5, particularly comprising:

forming the frame sealant compositions 1-9 into frame sealant films 1-9;
   sealing silica gels having the same weight with the frame sealant films 1-9 within the container shown in FIG. 3 and measuring the total weight A, and
   measuring the total weight B after placing the samples under different temperature and humidity environments shown in Table 1 for 24 hr, wherein each of the films has a surface area of 0.3 $m^2$ on the container.

The silica gel can be replaced with other hygroscopic materials or desiccants.

Water permeability per unit area is calculated according to the following equation:

water permeability=(B−A)/area of frame sealant film (g/m$^2$), where, A and B are the total weights of the frame sealant film, hygroscopic material, and container before placing and after placing.

The calculated results are listed in Table 1 below.

TABLE 1

| water permeability (g/m$^2$) | | Sample No. of frame sealant films | | | | | | | | |
|---|---|---|---|---|---|---|---|---|---|---|
| | | 1 | 2 | 3 | 4 | 5 | 6 | 7 | 8 | 9 |
| Experiment conditions | 20° C./60% RH | 24 | 21 | 23.4 | 26.2 | 30.3 | 29.8 | 29.7 | 29.9 | 27.2 |
| | 30° C./70% RH | 30.2 | 25.2 | 29 | 31.12 | 45.2 | 44.9 | 46 | 45.23 | 34.5 |
| | 30° C./80% RH | 33.4 | 29.3 | 32 | 35.2 | 55.1 | 54.8 | 55.3 | 55.3 | 40.6 |
| | 30° C./90% RH | 37.9 | 32.1 | 36.7 | 40.7 | 59.6 | 60.1 | 60.3 | 60.3 | 47 |

It can be seen from Table 1, the frame sealant film samples from Examples 1-4 to which silica fillers having a shape of irregular polyhedron are added have water permeability much smaller than that of the frame sealant film samples 5-8 to which conventional spherical silica fillers are added, demonstrating that the waterproof property of the films formed by the frame sealants according to the examples of the present invention are considerably increased. Among them, when the hydrophobic silica fillers are added in an amount of 5 wt %, 7.5 wt %, the effect of decreasing water permeability and increasing the waterproof property is most significant. Further, comparing frame sealant film sample 1 (Example 1) to sample 9 (Comparative Example 5), it can be clear that the addition of dispersant can significantly decrease water permeability and increase the waterproof property, in the case of introducing silica fillers having a shape of irregular polyhedron. This proves that adding both silica fillers having a shape of irregular polyhedron and the dispersant to the frame sealant composition can significantly enhance the waterproof property of the frame sealant composition. This is because the irregular polyhedron shape possessed by the silica fillers can increase the whole surface area of the silica fillers, thereby improving the hydrophobicity thereof. On the other hand, the dispersant added can allow the silica fillers in the frame sealant composition to be evenly distributed and avoid large void caused by aggregated distribution, thereby improving the waterproof property. Therefore, even if under an environment of high temperature and high humidity with a harsh requirement on reliability, the frame sealant formed by the frame sealant composition can effectively prevent water molecules from entering the liquid crystal panel interior to corrode the metal wires, thereby extending the life time of the display device.

The above description only represents some preferred embodiments of the present invention and is not intended to limit the scope of the present invention.

The invention claimed is:

1. A frame sealant composition, comprising:
   70 wt %-80 wt % of a resin,
   2 wt %-10 wt % of a catalyst,
   2 wt %-10 wt % of a solvent,
   2.5 wt %-10 wt % of a hydrophobic silica filler,
   1 wt %-1.5 wt % of silicon spheres;
   wherein, the hydrophobic silica filler has a shape of irregular polyhedron, and the resin is a mixture of an acrylate resin and an epoxy resin.

2. The frame sealant composition of claim 1, further comprising 1.5 wt % -3 wt % of a dispersant.

3. The frame sealant composition of claim 2, wherein, the dispersant is selected from at least one of N,N-dimethylaminopropylamine and polyacrylate.

4. The frame sealant composition of claim 2, wherein, the hydrophobic silica filler is added in amount of 5 wt %-7.5%.

5. The frame sealant composition of claim 2, wherein, the hydrophobic silica filler has an average particle size of 150 nm-250 nm.

6. The frame sealant composition of claim 2, wherein, the epoxy resin and the acrylate resin independently have a number-average molecular weight of 5000-10000.

7. The frame sealant composition of claim 1, wherein, the hydrophobic silica filler is added in amount of 5 wt %-7.5 wt %.

8. The frame sealant composition of claim 1, wherein, the hydrophobic slice filler has an average particle size of 150 nm-250 nm.

9. The frame sealant composition of claim 1, wherein, the epoxy resin and the acrylate resin independently have a number-average molecular weight of 5000-10000.

10. The frame sealant composition of claim 1, wherein, the weight ratio of the acrylate resin to the epoxy resin is 55-95:5-45.

11. A method of preparing a frame sealant composition of claim 1, comprising the steps of:
   a. ultrasonically oscillating hydrophobic silica particles under a first ultrasonication condition to produce hydrophobic silica particles having a shape of irregular polyhedron;
   b. mixing the hydrophobic silica particles having a shape of irregular polyhedron with a dispersant and a solvent, and ultrasonically dispersing the mixture under a second ultrasonication condition, to produce a dispersion of hydrophobic silica particles;
   c. mixing an epoxy resin, an acrylate resin, a catalyst, and a solvent, to form a resin mixture; and
   d. homogeneously mixing the dispersion of hydrophobic silica particles with the resin mixture, to produce the frame sealant composition.

12. The method of preparing a frame sealant composition of claim 11, wherein, the first ultrasonication condition comprises an ultrasonication at 50 kHz for 5-20 min.

13. The method of preparing a frame sealant composition of claim 11, wherein, the second ultrasonication condition comprises an ultrasonication at 90 kHz for 5-20 min.

14. The method of preparing a frame sealant composition of claim 11, wherein, the method further comprises a step of performing an ultrasonic grading at 50 kHz after the step of ultrasonically oscillating under the second ultrasonication condition.

15. An liquid crystal panel, comprising an array substrate and an opposite substrate which are oppositely provided, wherein, the array substrate and the opposite substrate are sealed with the frame sealant composition of claim 1.

* * * * *